(12) United States Patent
Stewart

(10) Patent No.: US 9,952,618 B2
(45) Date of Patent: Apr. 24, 2018

(54) HANDLEBAR GRIPS AND HANDLEBAR ASSEMBLIES INCLUDING THE SAME

(71) Applicant: Extreme Steering, Inc., Phelan, CA (US)

(72) Inventor: Gary Stewart, Oak Hills, CA (US)

(73) Assignee: Extreme Steering, Inc., Phelan, CA (US)

( * ) Notice: Subject to any disclaimer, the term of this patent is extended or adjusted under 35 U.S.C. 154(b) by 160 days.

(21) Appl. No.: 14/588,844

(22) Filed: Jan. 2, 2015

(65) Prior Publication Data
US 2016/0195892 A1 Jul. 7, 2016

(51) Int. Cl.
*B62K 21/26* (2006.01)
*G05G 1/06* (2006.01)

(52) U.S. Cl.
CPC .............. *G05G 1/06* (2013.01); *B62K 21/26* (2013.01)

(58) Field of Classification Search
CPC . G05G 1/06; B62K 21/26; B25G 1/10; B25G 1/102
USPC ........................................................ 74/551.9
See application file for complete search history.

(56) References Cited

U.S. PATENT DOCUMENTS

| | | | | |
|---|---|---|---|---|
| 3,122,774 A * | 3/1964 | Lamb | ...................... | B25G 1/102 135/72 |
| 3,995,650 A * | 12/1976 | DiVito | ..................... | A61H 3/02 135/72 |
| 5,829,099 A * | 11/1998 | Kopelman | ............. | B25G 1/102 16/430 |
| 6,389,929 B1 * | 5/2002 | Calilung | ................ | B62K 23/04 16/110.1 |
| 6,779,937 B1 * | 8/2004 | Lombardi | ............ | A45D 40/205 401/6 |
| 7,028,581 B2 * | 4/2006 | Williams | ............... | B62K 21/26 16/DIG. 12 |
| 7,814,812 B1 * | 10/2010 | Ziegahn | ................. | B62K 21/26 16/421 |
| 2002/0124353 A1 * | 9/2002 | Holland-Letz | ......... | B25G 1/102 16/430 |
| 2003/0074766 A1 * | 4/2003 | Tillim | ................ | A61B 17/2909 16/430 |
| 2007/0012136 A1 * | 1/2007 | Burner | ................. | A01B 33/028 74/502.2 |
| 2007/0143966 A1 * | 6/2007 | Fischer | ................... | B25F 5/006 16/422 |
| 2009/0158884 A1 * | 6/2009 | Kuo | ...................... | B62K 21/26 74/551.9 |
| 2010/0095487 A1 * | 4/2010 | Gitman | ................. | B25G 1/102 16/430 |
| 2012/0137821 A1 * | 6/2012 | Badollet | ............... | B62K 21/26 74/551.9 |

* cited by examiner

*Primary Examiner* — Vicky A Johnson
(74) *Attorney, Agent, or Firm* — Henricks, Slavin & Holmes LLP

(57) ABSTRACT

A handlebar grip including an inward portion defining an inward portion outer diameter, an outward portion defining an outward portion outer diameter, and a recessed portion, located between the inward portion and the outward portion, and defining a recessed portion outer diameter that is less than the inward portion outer diameter and the outward portion outer diameter.

30 Claims, 3 Drawing Sheets

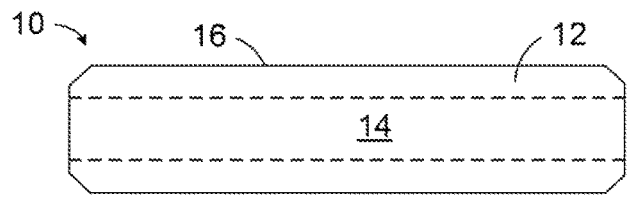
FIG. 1 – Prior Art
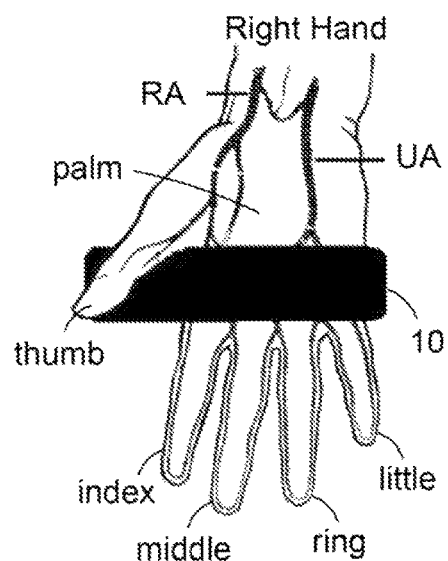
FIG. 2 – Prior Art
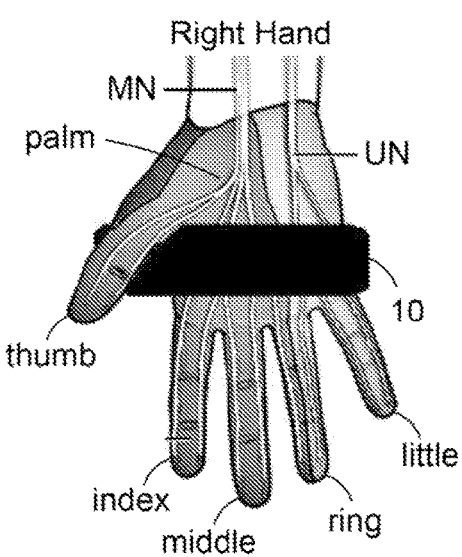
FIG. 3 – Prior Art
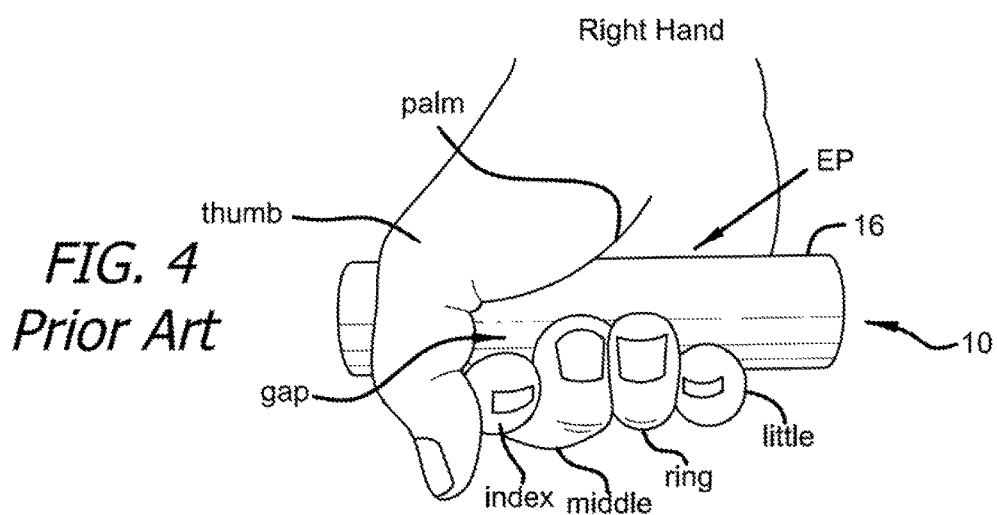
FIG. 4 Prior Art

HANDLEBAR GRIPS AND HANDLEBAR ASSEMBLIES INCLUDING THE SAME

BACKGROUND OF THE INVENTIONS

Field of the Inventions

The present inventions relate generally to handlebar grips including, but not limited to, bicycle handlebar grips, and handlebar assemblies including the same.

Description of the Related Art

Handlebar grips are used to make gripping handlebars more comfortable, to prevent the rider's hands from slipping, and to improve the rider's grip on the handlebar. The grips are commonly formed from relatively soft materials such as, for example, silicone, rubber, foam rubber, leather or the like.

The present inventor has determined that conventional handlebar grips are susceptible to improvement. For example, many conventional handlebar grips are either cylindrically shaped or include a middle region that bulges radially outwardly. The present inventor has determined that such handlebar grip configurations result in an uneven distribution of palm pressure and cause the rider's palm to create excessive pressure on the ulnar nerve and ulnar artery. The excessive pressure can result in numbness and tingling in the ring and little (or "pinkie") fingers, or hand weakness, or a combination of the two.

SUMMARY

A handlebar grip in accordance with one embodiment of a present invention includes an inward portion defining an inward portion outer diameter, an outward portion defining an outward portion outer diameter, and a recessed portion, located between the inward portion and the outward portion, and defining a recessed portion outer diameter that is less than the inward portion outer diameter and the outward portion outer diameter. A handlebar assembly in accordance with one embodiment of a present invention includes a handlebar and a pair of such handlebar grips.

There are a number of advantages associated with the present handlebar grips and assemblies. By way of example, but not limitation, the recessed portion of the present handlebar grips increases the effectiveness to the two fingers (i.e., the index finger and middle finger) that have greatest effect on the hand's grip strength. The present grip configuration also causes the position of the palm to rotate or tilt slightly, as compared to a conventional grip, which transfers some of the pressure that the palm exerts on the ulnar nerve and ulnar artery to the medial nerve and the radial artery. The transfer results in a more even distribution of pressure that eliminates the numbness, tingling and/or hand weakness associated with the conventional grips.

The features of the present inventions will become apparent as the inventions become better understood by reference to the following detailed description when considered in conjunction with the accompanying drawings.

BRIEF DESCRIPTION OF THE DRAWINGS

Detailed description of embodiments of the inventions will be made with reference to the accompanying drawings.

FIG. 1 is a plan view of a conventional handlebar grip.

FIG. 2 is a plan view of a conventional handlebar grip in an open hand.

FIG. 3 is a plan view of a conventional handlebar grip in an open hand.

FIG. 4 is a plan view of a conventional handlebar grip in a closed hand.

DETAILED DESCRIPTION

Figure 5:
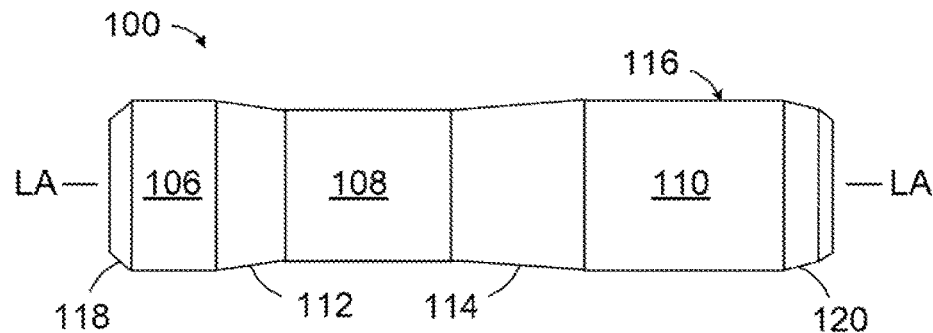
FIG. 5 is a plan view of a handlebar grip in accordance with one embodiment of a present invention.

The following is a detailed description of the best presently known modes of carrying out the inventions. This description is not to be taken in a limiting sense, but is made merely for the purpose of illustrating the general principles of the inventions.

The conventional handlebar grip 10 illustrated in FIG. 1 is a tubular structure with a wall 12 and an inner lumen 14, is formed from an elastomeric material such as silicone, rubber, foam rubber, leather or the like. The outer surface 16 of the wall 12 has a right circular cylindrical shape, the inner lumen 14 is sized to fit over a handlebar, and the thickness of the wall is constant. The edges may be beveled at the longitudinal ends of the wall 12 (as shown) or not beveled. The conventional handlebar grip 10 fits into the human hand (or "hand") in the manner illustrated in FIGS. 2-4. Referring first to FIGS. 2 and 3, the hand has a plurality of fingers, i.e., the thumb, index, middle, ring and little fingers. The also hand has radial and ulnar arteries RA and UA as well as median and ulnar nerves MN and UN, and the location of these arteries and nerves relative to the palm and fingers is shown in FIGS. 2 and 3. The conventional handlebar grip 10 illustrated in FIG. 1 is gripped in the manner illustrated in FIG. 4. The present inventor has determined that the configuration of the conventional handlebar grip 10, as well as the configuration of those grips that bulge radially outward in the middle region, results in an uneven distribution of palm pressure and causes the palm and grip to create excessive pressure on the ulnar nerve and ulnar artery in the location identified by reference character EP. The excessive pressure can result in numbness and tingling in the ring and little fingers, or hand weakness, or a combination of the two. It should also be noted that the thickness of the wall 12 is selected based on area of grip that is associated the most pressure and requires the most padding. The present inventor has determined that the result is a relatively large grip outer diameter and a gap between the index and middle fingers and the thumb and palm, which decreases the effectiveness to the two fingers (i.e., the index and middle finger) that have greatest effect on the hand's grip strength.

Figure 6:
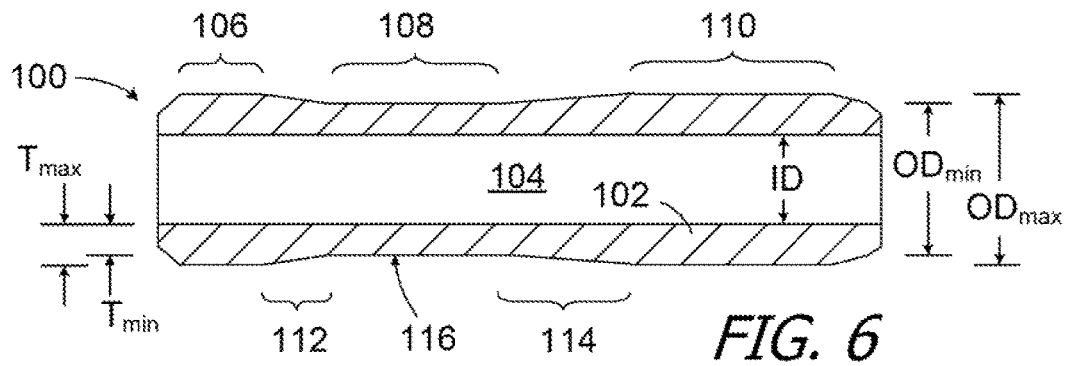
FIG. 6 is a section view of the handlebar grip illustrated in FIG. 5.
Figure 7:
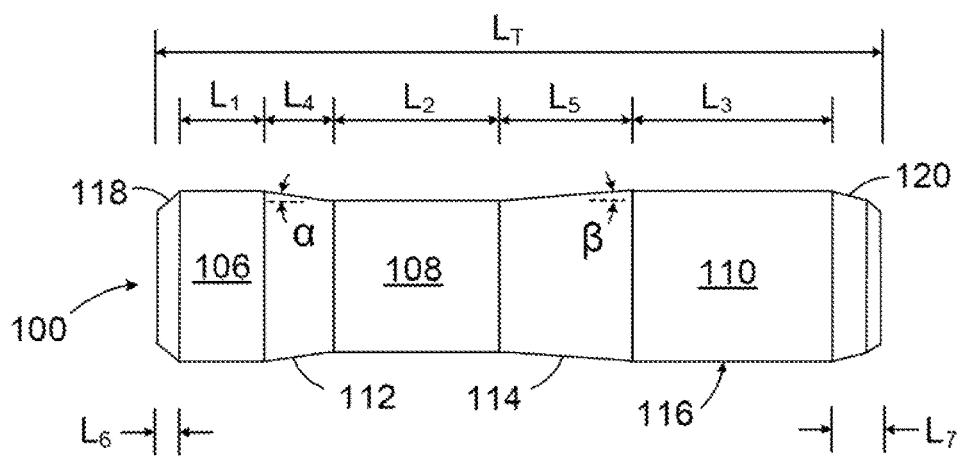
FIG. 7 is a plan view of the handlebar grip illustrated in FIG. 5.

The exemplary handlebar grip 100 illustrated in FIGS. 5-7 is a tubular structure with a wall 102 and an inner lumen 104 that is sized to fit over the associated handlebar. The wall 102 includes a plurality of regions which correspond, either alone or in combination with an adjacent region, to respective portions of the hand in the manner described below with reference to FIGS. 9-11. In particular, the wall 102 has three cylindrical regions 106, 108 and 110 that have a constant outer diameter, and two tapered regions 112 and 114 that have outer diameters which vary over their respective lengths. The regions 106-114 define the outer surface 116 of the wall 102 and grip 100. In the illustrated embodiment, the taper is constant (or "flat") within each of the tapered regions 112 and 114 and, accordingly, the outer surface 116 within each region is linear when viewed in cross-section (FIG. 6). The cylindrical region 106 is the region of the wall 102 that is located closest to the stem (or other structure) that connects the handlebar to the forks, as is discussed below with reference to FIG. 8, while the cylindrical region 110 is the region that is located at or near the outer end of the handlebar.

Each of the cylindrical regions 106, 108 and 110 and tapered regions 112 and 114 in the illustrated embodiment is symmetric about the longitudinal axis LA (FIG. 5) of the grip 100. The outer surface 116 within each region 106-114 in the illustrated embodiment is circular along its length in planes perpendicular to the longitudinal axis LA. As a result, the functionality of the grip 100 will remain the same when the rider's hand is repositioned to different locations around the longitudinal axis LA.

The cylindrical regions 106, 108 and 110 in the exemplary embodiment are right cylinders and each have a constant outer diameter. The outer diameter of the outer surface 116 of the wall 102 ranges from a maximum outer diameter $OD_{max}$ to a minimum outer diameter $OD_{min}$. The outer diameter of the cylindrical regions 106 and 110 is equal to the maximum outer diameter $OD_{max}$ in the illustrated embodiment, while the outer diameter of the cylindrical region 108 is equal to the minimum outer diameter $OD_{min}$. In other embodiments, the diameters of the cylindrical regions 106 and 110 may be different than one another, although both diameters will be greater than that of the cylindrical region 108 therebetween. The diameter of each of the two tapered regions 112 and 114 varies from the maximum outer diameter $OD_{max}$ to the minimum outer diameter $OD_{min}$. In the illustrated embodiment, the inner diameter ID is constant and the variation in outer diameter from $OD_{max}$ to $OD_{min}$ is the result of the variation in the thickness of the wall 102. The thickness of the wall 102 ranges from a maximum wall thickness $T_{max}$ to a minimum wall thickness $T_{min}$.

The exemplary implementation also includes beveled edges 118 and 120 (note FIG. 5). The slope of the beveled edge 118 is constant, while the beveled edge 120 has two portions with different slopes. The beveled edges 118 and 120 serve as an edge break for transition comfort and eliminate sharp edges at the longitudinal ends of the grip 100. The beveled edges 118 and 120 may also be omitted in other embodiments.

With respect to dimensions, which may vary so that differently sized grips may be provided for differently sized hands, and referring to FIGS. 6 and 7, the outer diameter $OD_{max}$ of the cylindrical regions 106 and 110 (or "inward and outward portions") may range from 1.1 inches to 1.35 inches in some embodiments and is 1.2 inches in the illustrated embodiment, while the outer diameter of the cylindrical region 108 may range from 0.94 inch to 1.19 inches in some embodiments and is 1.04 inches in the illustrated embodiment. The length $L_1$ of the cylindrical region 106 may range from 0.55 inch to 0.75 inch in some embodiments and is 0.6 inch in the illustrated embodiment. The length $L_2$ of the cylindrical region 108 may range from 1.1 inches to 1.3 inches in some embodiments and is 1.2 inches in the illustrated embodiment. The length $L_3$ of the cylindrical region 110 may range from 1.3 inches to 1.5 inches in some embodiments and is 1.35 inches in the illustrated embodiment. The length $L_4$ of the shorter tapered region 112 may range from 0.5 inch to 0.6 inch in some embodiments and is 0.55 inch in the illustrated embodiment, while the length $L_5$ of the longer tapered region 114 may range from 0.9 inch to 1.1 inches and is 1.0 inch in the illustrated embodiment. The angle α, which represents the slope of the tapered region 112, may range from 4° to 5° in some embodiments and is 4.6° in the illustrated embodiment, while the angle β, which represents the slope of the tapered region 114, may range from 4° to 4.6° in some embodiments and is 4.3° in the illustrated embodiment. In those instances where the beveled edges 118 and 120 are included, the length $L_6$ of the beveled edge 118 may range from 0.13 inch to 0.17 inch in some embodiments and is 0.15 inch in the illustrated embodiment, while the length $L_7$ of the beveled edge 120 may range from 0.3 inch to 0.4 inch in some embodiments and is 0.35 inches in the illustrated embodiment. So dimensioned, the total length $L_T$ of the handlebar grip 100 may range from 5 inches to 5.8 inches in some embodiments and is 5.2 inches in the illustrated embodiment. In some additional embodiments, the length $L_1$ of the cylindrical region 106 may be extended by up to 3.0 inches to accommodate certain types of handlebars, thereby extending the total length $L_T$ of the handlebar grip 100 to up to 8.2 inches.

Turning to materials, suitable materials for the grip 100 include, but are not limited to, silicone, such as closed cell silicone sponge in accordance with Aerospace Material Specifications (AMS) D3195, rubber, foam rubber, leather or the like. The hardness of relatively soft materials such as those listed above may be expressed in terms of the amount of compression pressure that will cause a 25% change in thickness, as specified in accordance with American Society for Testing Materials (ASTM) designations D575 and D1056. So specified, suitable materials for the grip 100 are materials that exhibit a 25% change in thickness when subjected to a compression pressure that ranges from 6 to 14 pounds-force per square inch (psi) and is 10 psi in the illustrated embodiment. This property is expressed herein as "psi/25%ΔT."

So configured, the present handlebar grip 100 defines various ratios and relationships that maximize its effectiveness. For example, the ratio of the outer diameter of the cylindrical region 110 to the outer diameter of the cylindrical region 108 (or "$OD_{OUTWARD}/OD_{RECESS}$" or "diameter ratio") may range from 1.1 to 1.3 and is 1.15 in the illustrated embodiment. The ratio of the hardness to the diameter ratio, i.e. [psi/25%ΔT]/[$OD_{OUTWARD}/OD_{RECESS}$] and expressed in psi/25%ΔT because the diameter ratio is unit-less, may range from 4.6 psi/25%ΔT to 12.7 psi/25%ΔT and is 8.7 psi/25%ΔT in the illustrated embodiment.

Figure 8:
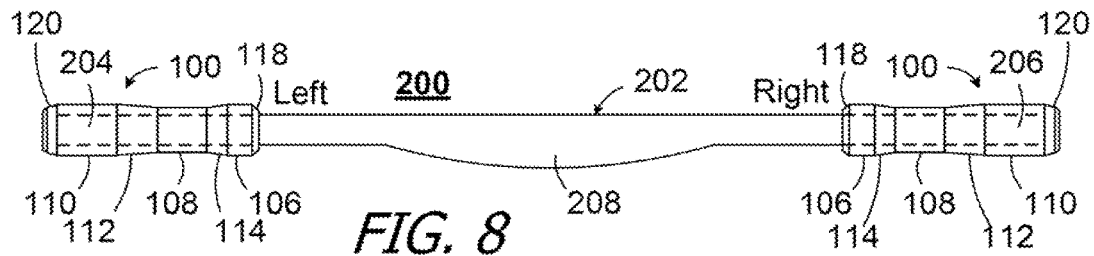
FIG. 8 is a top view of a handlebar assembly.

One example of a handlebar assembly, which is generally represented by reference numeral 200 in FIG. 8, includes a handlebar 202 and handlebar grips 100 mounted on each of the ends 204 and 206 of the handlebar. The center region 208 of the handlebar 202 may be connected to the stem (or other structure) that connects the handlebar to the forks. The handlebar 202 may be straight (as shown), curved, or any other handlebar configuration, and the handlebar grip 100 conforms to the underlying straight or curved shape. The grips 100 are oriented such that the cylindrical region 106 of each grip defines the inward portion of the grip, i.e. the portion intended to be located closest to the center region 208 of the handlebar 202, while cylindrical region 110 of each grip defines the outward portion of the grip, i.e. the portion intended to be located closest to the end 204 (or 206) of the handlebar 202. The cylindrical region 110 and tapered regions 112 and 114 together define a recessed portion of the grip 100 that is located between the inward and outward portions. The recessed portion decreases in outer diameter from the cylindrical region 106 to the cylindrical region 108 and increases in outer diameter from the cylindrical region 108 to the cylindrical region 110.

It should be noted that there is only one recessed portion in the illustrated embodiment. As used herein, "only one" means one and no more than one. The beveled edges 118 and 120 are not recessed portions because they do not have outer diameters both decrease and increase.

Figure 9:
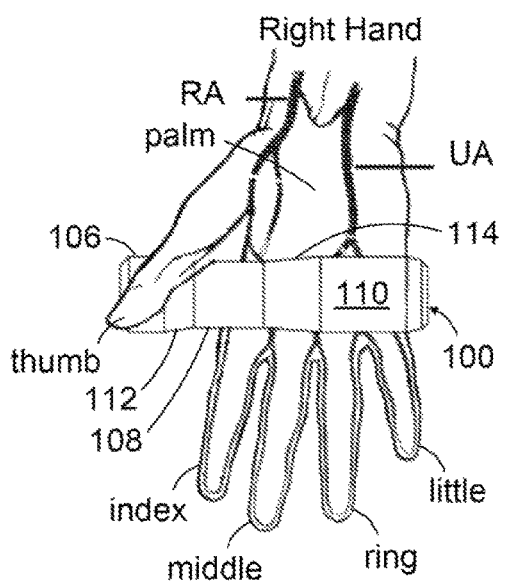
FIG. 9 is a plan view showing the handlebar grip illustrated in FIG. 5 in an open hand.
Figure 10:
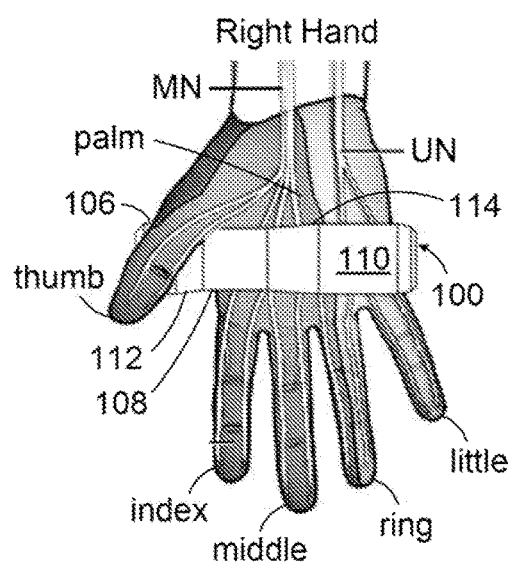
FIG. 10 is a plan view showing the handlebar grip illustrated in FIG. 5 in an open hand.

FIGS. 9 and 10 show the handlebar grip 100 positioned against an open hand in the location that it will be when the hand is closed. Although the right hand is shown, the description herein is equally applicable to the left hand. The above-described configuration of the grip 100 results in the little and ring fingers being aligned with the cylindrical region 110, the middle finger being aligned with the tapered region 114, and the index finger being aligned with the cylindrical region 108. The ulnar artery UA and ulnar nerve UN are aligned with the cylindrical region 110, while the radial artery RA and median nerve MN are aligned with both the cylindrical region 108 and the tapered region 114. The thumb is aligned with the cylindrical region 106 and the tapered region 112 when the hand is open.

Figure 11:
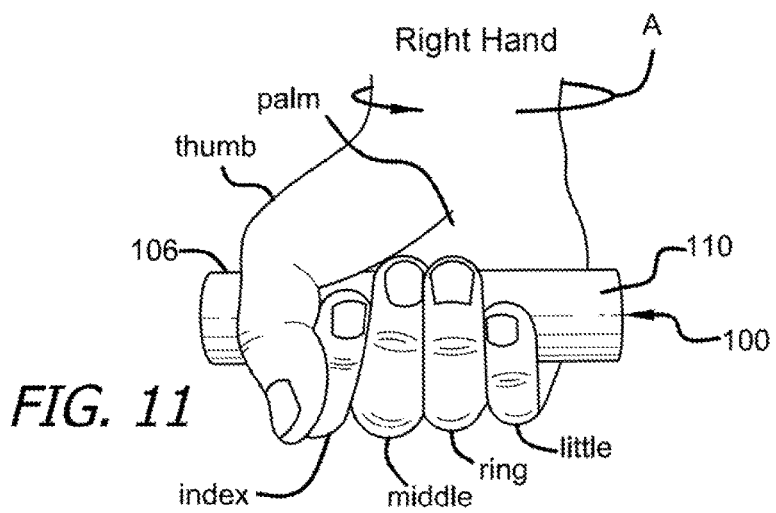
FIG. 11 is a plan view showing the handlebar grip illustrated in FIG. 5 in a closed hand.

There are a variety of advantages associated with the configuration of the handlebar grip 100. Turning to FIG. 11, which shows the right hand in a closed state while gripping the handlebar grip 100, part of the recessed portion of the grip (i.e., the cylindrical region 108 and tapered region 114) allows the index and middle fingers to reach the thumb/palm, thereby eliminating the gap discussed above with reference to FIG. 4 and increasing the effectiveness to the two fingers (i.e., the index finger and middle finger) that have greatest effect on the hand's grip strength. This allows the index and middle fingers to lock onto the grip 100 for non-slip bar control during turning and/or riding over rough terrain. Tightening the grip of the index and middle fingers also causes the position of the palm to rotate or tilt slightly (note arrow A) as compared to conventional grips, such as that illustrated in FIGS. 1-4 with a constant outer diameter that is equal to outer diameter of region 110, thereby cradling the hand with a more naturally shaped grip surface. This repositioning transfers some of the pressure that the palm exerts on the ulnar nerve and ulnar artery to the medial nerve and the radial artery. In other words, the cylindrical region 108 and tapered region 114 of the grip 100 together perform the function of supporting a closed hand on the handlebar in such a manner that tightening the grip of the index finger and middle finger of the hand will transfer pressure from the ulnar nerve and ulnar artery of the hand to the medial nerve and the radial artery of the hand. The result is a more even distribution of pressure that eliminates the numbness, tingling and/or hand weakness associated with the conventional grips such as that illustrated in FIGS. 1-4 with a constant outer diameter that is equal to outer diameter of region 110. The tapered region 112 creates a comfortable transition from the smaller outer diameter associated with the cylindrical region 108 to the larger outer diameter associated with the cylindrical region 106, and the tapered region 112 and cylindrical region 106 together form a positive stop that prevents the hand from sliding off the grip 100 towards the center of the handlebar. It should also be noted that the variation in wall thickness allows the grip 100 to maintain shock absorbing properties where it is needed most (cylindrical region 106), while providing a reduced outer diameter where that is needed most.

Although the present inventions have been described in terms of the preferred embodiments above, numerous modifications and/or additions to the above-described preferred embodiments would be readily apparent to one skilled in the art. It is intended that the scope of the present inventions extend to all such modifications and/or additions.

I claim:

1. A handlebar grip, comprising:
   an inward portion defining an inward portion outer diameter and an inward portion wall thickness;
   an outward portion defining an outward portion outer diameter and an outward portion wall thickness; and
   a recessed portion, located between the inward portion and the outward portion, and defining a recessed portion outer diameter that is less than the inward portion outer diameter and the outward portion outer diameter and a recessed portion wall thickness that is less than the inward portion wall thickness and the outward portion wall thickness;
   wherein the outward portion outer diameter and the recessed portion outer diameter define an outer diameter ratio that ranges from 1.1 to 1.3.

2. A handlebar grip as claimed in claim 1, wherein the inward portion outer diameter is equal to the outward portion outer diameter.

3. A handlebar grip as claimed in claim 1, wherein the inward portion outer diameter and the outward portion outer diameter are constant.

4. A handlebar grip as claimed in claim 3, further comprising:
   an inward beveled edge associated with the inward portion; and
   an outward beveled edge associated with the outward portion.

5. A handlebar grip as claimed in claim 1, wherein the recessed portion includes a cylindrical portion.

6. A handlebar grip as claimed in claim 5, wherein the cylindrical portion is circular from the first tapered portion to the second tapered portion.

7. A handlebar grip as claimed in claim 5, wherein the recessed portion includes a first tapered portion that extends from the inward portion to the cylindrical portion and a second tapered portion that extends from the cylindrical portion to the outward portion.

8. A handlebar grip as claimed in claim 1, wherein the inward portion defines an inward portion inner diameter, the outward portion defines an outward portion inner diameter, and the recessed portion defines a recessed portion inner diameter; and
   the inward portion inner diameter, the outward portion inner diameter, and the recessed portion inner diameter are equal to one another.

9. A handlebar grip as claimed in claim 1, wherein the inward portion wall thickness is equal to the outward portion wall thickness.

10. A handlebar grip as claimed in claim 1, wherein the inward portion defines an inward portion length and the outward portion defines an outward portion length; and
    the inward portion length is less than the outward portion length.

11. A handlebar grip as claimed in claim 1, wherein the outward portion and the recessed portion are respectively configured such that the pressure that the palm exerts on the ulnar nerve and ulnar artery when a hand is closed around the handlebar grip is less than the pressure that the palm exerts on the ulnar nerve and ulnar artery when a hand is closed around a handlebar grip with a constant outer diameter.

12. A handlebar grip as claimed in claim 1, wherein the outward portion and recessed portion are formed from material that has a hardness; and
the ratio of the hardness to the outer diameter ratio ranges from 4.6 psi per 25% change in thickness to 12.7 psi per 25% change in thickness.

13. A handlebar grip as claimed in claim 1, wherein the handlebar grip includes only one recessed portion.

14. A handlebar grip as claimed in claim 1, wherein the recessed portion defines an outer surface, a longitudinal axis and a length that extends from the inward portion to the outward portion; and
the outer surface of the recessed portion is circular along its length in planes perpendicular to the longitudinal axis.

15. A handlebar grip as claimed in claim 1, wherein the length of the outward portion is 1.3 inches to 1.5 inches.

16. A handlebar assembly, comprising:
a handlebar including first and second ends and a central region between the first and second ends; and
a first grip and a second grip, each grip including an inward portion defining an inward portion outer diameter and an inward portion wall thickness, an outward portion defining an outward portion outer diameter, an outward portion wall thickness and a length that is from 1.3 inches to 1.5 inches, and a recessed portion, located between the inward portion and the outward portion, and defining a recessed portion outer diameter that is less than the inward portion outer diameter and the outward portion outer diameter and a recessed portion wall thickness that is less than the inward portion wall thickness and the outward portion wall thickness;
wherein the first grip is on the handlebar first end with the inward portion facing the central region and the second grip is on the handlebar second end with the inward portion facing the central region.

17. A handlebar assembly as claimed in claim 16, wherein the inward portion outer diameter is equal to the outward portion outer diameter.

18. A handlebar assembly as claimed in claim 16, wherein the inward portion outer diameter and the outward portion outer diameter are constant.

19. A handlebar assembly as claimed in claim 18, further comprising:
an inward beveled edge associated with the inward portion; and
an outward beveled edge associated with the outward portion.

20. A handlebar assembly as claimed in claim 16, wherein the recessed portion includes a cylindrical portion.

21. A handlebar assembly as claimed in claim 20, wherein the recessed portion includes a first tapered portion that extends from the inward portion to the cylindrical portion and a second tapered portion that extends from the cylindrical portion to the outward portion.

22. A handlebar assembly as claimed in claim 16, wherein the inward portion defines an inward portion inner diameter, the outward portion defines an outward portion inner diameter, and the recessed portion defines a recessed portion inner diameter; and
the inward portion inner diameter, the outward portion inner diameter, and the recessed portion inner diameter are equal to one another.

23. A handlebar assembly as claimed in claim 16, wherein the inward portion wall thickness is equal to the outward portion wall thickness.

24. A handlebar assembly as claimed in claim 16, wherein the inward portion defines an inward portion length and the outward portion defines an outward portion length; and
the inward portion length is less than the outward portion length.

25. A handlebar assembly as claimed in claim 16, wherein the outward portion and the recessed portion are respectively configured such that the pressure that palms exert on the ulnar nerve and ulnar artery when hands are closed around the grips is less than the pressure that the palms exert on the ulnar nerve and ulnar artery when hands are closed around handlebar grips with a constant outer diameter.

26. A handlebar assembly as claimed in claim 16, wherein the outward portion outer diameter and the recessed portion outer diameter define an outer diameter ratio that ranges from 1.1 to 1.3.

27. A handlebar assembly as claimed in claim 16, wherein the outward portion outer diameter and the recessed portion outer diameter define an outer diameter ratio;
the outward portion and recessed portion are from material that has a hardness; and
the ratio of the hardness to the outer diameter ratio ranged from 4.6 psi per 25% change in thickness to 12.7 psi per 25% change in thickness.

28. A handlebar assembly as claimed in claim 16, wherein the handlebar grips each include only one recessed portion.

29. A handlebar assembly as claimed in claim 16, wherein the outward portion is formed from material selected from the group consisting of silicone, rubber, foam rubber and leather.

30. A handlebar assembly as claimed in claim 16, wherein the recessed portion defines an outer surface, a longitudinal axis and a length that extends from the inward portion to the outward portion; and
the outer surface of the recessed portion is circular along its length in planes perpendicular to the longitudinal axis.

* * * * *